United States Patent
Dold et al.

(10) Patent No.: US 8,322,122 B2
(45) Date of Patent: Dec. 4, 2012

(54) DRIVE ARRANGEMENT FOR A HARVESTING HEADER OF A HARVESTING MACHINE

(75) Inventors: Matthew George Dold, Mandelbachtal (DE); Stefan Groβ, Riegelsberg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/100,403

(22) Filed: May 4, 2011

(65) Prior Publication Data

US 2012/0102905 A1 May 3, 2012

(30) Foreign Application Priority Data

May 5, 2010 (DE) .......................... 10 2010 028 605

(51) Int. Cl.
*A01D 34/00* (2006.01)
(52) U.S. Cl. ........................................................ 56/15.6
(58) Field of Classification Search ................... 403/57, 403/327; 464/160, 83, 118, 30, 38, 172, 464/182; 56/16.4 R, 16.4 A, 14.9, 15.6
See application file for complete search history.

(56) References Cited

U.S. PATENT DOCUMENTS

| | | | | |
|---|---|---|---|---|
| 3,324,637 A * | 6/1967 | Windsor et al. | ................ | 56/15.6 |
| 4,253,295 A * | 3/1981 | Knepper | ........................ | 56/15.6 |
| 4,266,391 A * | 5/1981 | McDuffie et al. | .............. | 56/14.5 |
| 4,280,317 A * | 7/1981 | Lindblom et al. | ............. | 56/15.6 |
| 4,612,757 A * | 9/1986 | Halls et al. | ................. | 56/10.2 E |
| 4,733,523 A * | 3/1988 | Dedeyne et al. | ................. | 56/209 |
| 5,832,705 A * | 11/1998 | Eis et al. | ........................ | 56/14.9 |
| 5,980,389 A * | 11/1999 | Nienhaus | ...................... | 464/172 |
| 6,152,827 A * | 11/2000 | Muller et al. | ................ | 464/160 |
| 6,318,057 B1 * | 11/2001 | Burmann | .................... | 56/10.2 R |
| 6,519,923 B1 * | 2/2003 | Cooksey et al. | ............... | 56/14.9 |
| 6,735,929 B2 * | 5/2004 | Watts et al. | ..................... | 56/14.9 |
| 6,810,649 B2 * | 11/2004 | Kempf | ......................... | 56/16.4 R |
| 7,220,075 B2 * | 5/2007 | Herchenbach et al. | ......... | 403/57 |
| 7,805,917 B2 * | 10/2010 | Kempf et al. | .................... | 56/181 |
| 2004/0240931 A1 * | 12/2004 | Herchenbach et al. | ......... | 403/57 |

FOREIGN PATENT DOCUMENTS

| | | |
|---|---|---|
| DE | 2111227 | 9/1971 |
| DE | 4412115 | 10/1995 |
| DE | 19916645 | 10/2000 |
| DE | 19918550 | 10/2000 |
| DE | 19949213 | 8/2001 |
| DE | 102005027586 | 1/2007 |
| DE | 102006002053 | 8/2007 |
| EP | 1440617 | 7/2004 |
| EP | 1884151 | 7/2007 |
| EP | 1985168 | 4/2008 |

* cited by examiner

*Primary Examiner* — Arpad Fabian-Kovacs

(57) ABSTRACT

A drive arrangement for a harvesting header of a harvesting machine is provided. The harvesting machine has a chassis on which a feeder housing is fastened. On the front side of the feeder housing a fastening device is attached. The fastening device is movable with respect to the feeder housing. On the fastening device, a harvesting header can be attached. The drive arrangement comprises an output shaft for driving the header, the output shaft being be set in rotation by the harvesting machine and is coupled with the fastening device and can move with the fastening device relative to the feeder housing. A harvesting header drive shaft of the harvesting header can be drivingly connected to the output shaft. It is further provided that a coupling with two coupling halves is attached between the output shaft and the harvesting header drive shaft, with these coupling halves separating automatically when the harvesting header is disassembled from the feeder housing and connecting automatically when the harvesting header, is attached on the feeder housing.

10 Claims, 2 Drawing Sheets

DRIVE ARRANGEMENT FOR A HARVESTING HEADER OF A HARVESTING MACHINE

FIELD OF THE INVENTION

The invention relates to a drive arrangement for a harvesting header of a harvesting machine. The drive arrangement comprises a running gear on which a feeder housing is fastened. On the front side of the feeder housing a fastening device is attached that can move relative to the feeder housing. A harvesting header can be fastened in a detachable way to the fastening device. The drive arrangement comprises an output shaft that can be set in rotation by the harvesting machine and is coupled with the fastening device such that the output shaft can move with the fastening device relative to the feeder housing. A harvesting header drive shaft of the harvesting header can be connected in a driving way to the output shaft.

BACKGROUND OF THE INVENTION

Agricultural harvesting machines such as self propelled forage harvesters and combines are typically of a self-propelled vehicle construction with a harvesting header that is fastened on the front side of the vehicle on a feeder housing in a detachable way. For transport on a street, the harvesting header is either removed from the feeder housing or brought into a transportation position with reduced width.

In order to be able, to better follow the contours of the ground, many harvesting headers are fastened on the feeder housing so that they can pivot about a horizontal axis extending in the forward direction. This applies especially to combine harvesters, whose wheels can move relative to the running gear in order to always orient the running gear horizontally (see for example European Patent Application EP 1 440 617 A1, considered class-forming). It has also been proposed to construct the harvesting header so that it can move relative to the feeder housing about a horizontal axis extending in the forward direction (see for example German Patent Documents DE 199 49 213 A1 and DE 199 16 645 A1) or to move the harvesting header relative to the feeder housing about the vertical axis (see for example German Patent Documents DE 10 2006 002 053 A1 and DE 10 2005 027 586 A1).

The drive of the driven elements of the harvesting header typically takes place by means of universal joint shafts that extend either perpendicular to the forward direction between an output shaft of the harvesting machine coupled with the lower slope conveyor cylinder and one or both lateral ends of the harvesting header, i.e., essentially perpendicular to the direction of motion (see for example German Patent Document DE 199 18 550 A), or extend in the forward direction. For harvesting headers that are fastened so that they can swing, telescoping universal joint shafts are used If the harvesting header is to be removed from the harvesting machine, first the universal joint shaft must be removed, which is relatively time-intensive because the driver must climb down from his operating position.

Automatic coupling systems are known that automatically establish the drive connection between the harvesting machine and the harvesting header, in that two coupling elements are moved relative to each other (see for example German Patent Documents DE 2 111 227 A1, EP 1 884 151 A1, EP 1 985 168 A1, DE 4 412 115 A1), but these coupling systems relate to harvesting headers that are rigidly fastened to the feeder housing. Consequently, they are not suited to harvesting headers that can move relative to the feeder housing.

SUMMARY OF THE INVENTION

The problem forming the basis of the invention is seen in providing an improved drive arrangement for a harvesting header on a harvesting machine in which the disadvantages named above do not exist or exist only to a reduced degree.

Accordingly, a harvesting machine comprises a running gear on which a feeder housing is fastened on whose front side a fastening device is attached that can move relative to the feeder housing. A frame of a harvesting header can be attached detachably to the fastening device. The drive system comprises an output shaft that can be set in rotation by a drive of the harvesting machine and is coupled with the fastening device and can move with the fastening device relative to the feeder housing, and with which a harvesting header drive shaft of the harvesting header can be connected by a coupling to two coupling halves in a driving way. One coupling half is allocated to the harvesting machine and is drivingly-connected to the output shaft. The other coupling half is allocated to the harvesting header and is used for driving the harvesting header drive shaft of the harvesting header. The coupling halves are constructed, for example, as claw couplings or shafts engaging with each other with internal and external teething, respectively, and automatically separate for disassembly of the harvesting header and automatically connect to each other for the attachment of the harvesting header on the feeder housing.

In this way a harvesting header can move relative to the feeder housing and can be removed and attached again, without the driver having to attach or disconnect a drive connection between the harvesting machine and the harvesting header.

The fastening device can be moved relative to the feeder housing about an axis extending in the forward direction and/or an axis extending horizontally and perpendicular to the forward direction. It is also conceivable to provide a fastening device that can move relative to the feeder housing about the vertical axis. The fastening device can be attached to an intermediate frame that can move relative to the feeder housing about an axis extending in the forward direction, while the fastening, device can be moved relative to the intermediate frame (or the intermediate frame relative to the feeder housing) in the forward direction. The coupling half on the side of the harvesting machine is coupled with the fastening device.

In one preferred embodiment, the fastening device comprises two pins that are arranged on two sides above a feeder opening of the feeder housing and extend horizontally and perpendicular to the forward direction. The pins can be fixed relative to the forward direction in different positions on the intermediate frame supported on the feeder housing. The harvesting header is equipped with hooks that can each be brought from above into a position surrounding a pin from above. The harvesting header is consequently fixed by the force of gravity on the fastening device and can be separated from it in that it is placed on a storage area and the feeder housing is lowered downward and finally pulled backward. The attachment is carried out in the reverse sequence. Other measures for locking the harvesting header on the feeder housing could also be provided, such as hooks that are arranged in the lower region of the feeder housing and engage under or over corresponding elements of the harvesting header. The different positions of the pins that can be selected allow the harvesting header to be attached relative to the feeder housing at different angles relative to the horizontal. In this way, the harvesting header can be held horizontally at different operating heights. However, different arrangements are also possible. The fastening arrangement and the output shaft with the coupling half on the side of the harvesting machine can be fastened rigidly on the intermediate frame, and the intermediate frame is fastened so that it can swing relative to the feeder housing and can be fastened in different positions in the forward direction.

One of the pins can be connected to the coupling half on the side of the harvesting machine by means of a bar hinged so that it can pivot about an axis that is horizontal and perpendicular to the forward direction, such that the coupling half is moved with the pin when this pin is brought into a different position.

The pivot axis of the bar and the coupling half on the side of the harvesting machine are advantageously located laterally next to the lower end of the feeder housing.

The pins can be inserted in one of several openings in U-shaped receptacles connected to the intermediate frame and an opening of the bar.

The intermediate frame can be fastened by a roller support so that it can rotate relative to the feeder housing about a virtual axis extending in the forward direction, although also a rotational support about a real axle would also be possible that is located advantageously in the middle on the top side of the feeder housing.

The output shaft is advantageously a universal joint shaft That extends in the forward direction and is connected to a drive on the side of the harvesting machine, wherein this drive could involve a mechanical gear that is connected mechanically to the combustion engine of the harvesting, machine or a hydraulic motor that is supplied with pressurized hydraulic fluid by a hydraulic pump driven mechanically by the combustion engine of the harvesting machine. In contrast, the harvesting header drive shaft is preferably drive-connected by means of an angular gear to a transverse shaft for the driving of drivable elements of the harvesting header.

In one preferred embodiment of the invention, the harvesting header drive shaft and the output shaft extend in the forward direction. In this way, a separation and connection of the two coupling halves is made possible without additional actuators, because the relative movement between the harvesting header and harvesting machine is carried out in precisely this direction for the attachment and removal of the harvesting header. In order to prevent an overload and a separation of the coupling halves for larger torques to be transmitted, however, there is the ability to bias the coupling halves against each other in the coupled state through spring force and/or an actuator.

The invention can be used in various harvesting machines, such as forage harvesters, cotton pickers, or combine harvesters.

BRIEF DESCRIPTION OF THE DRAWINGS

The invention is described in detail below with reference to the accompanying drawings wherein.

DESCRIPTION OF THE PREFERRED EMBODIMENT

Figure 1:
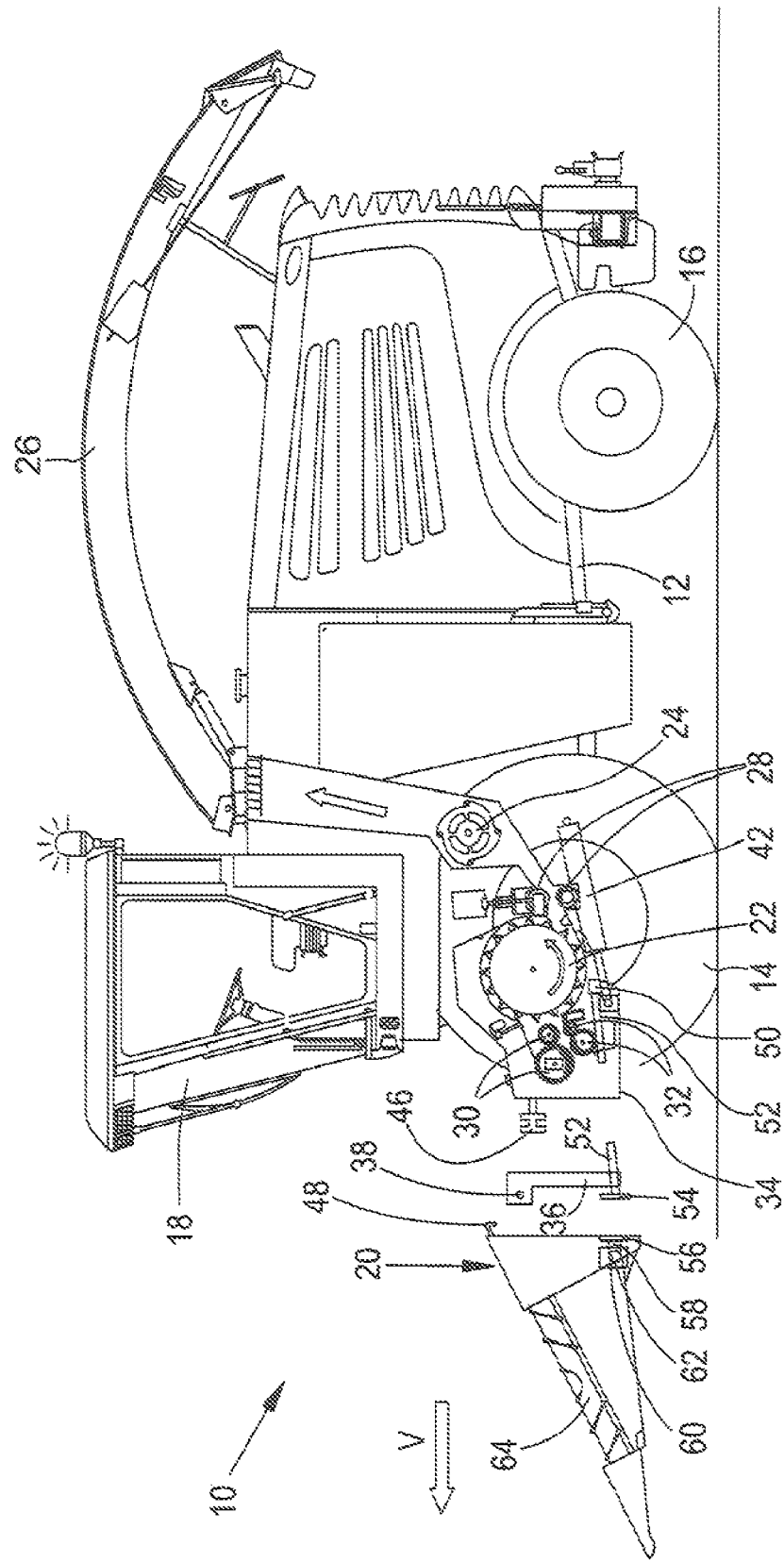
FIG. 1 is a schematic, partially sectioned side view of a harvesting machine with a harvesting header removed for illustration and intermediate frame.

In FIG. 1, a harvesting machine 10 in the form of a self-propelled forage harvester is shown in a schematic side view. The harvesting machine 10 is built on a running gear 12 that is carried by driven front wheels 14 and steerable rear wheels 16. The operation of the harvesting machine 10 is carried out from a driver cab 18 from which a harvesting header 20 in the form of a reaping header for corn can be seen. Crop picked from the ground up by means of the harvesting header 20, e.g., grass, corn or the like, is fed during crop operation by means of a feeder conveyor with upper pre-pressing rollers 30 and lower pre-pressing rollers 32 that are arranged within a feeder housing 34 on the front side of the harvesting machine 10 to a chopping device 22 arranged underneath the driver cab 18 in the form of a chopping drum that chops the crop into, small pieces and feeds it to a conveying device 24. The crop exits the work machine 10 onto a transport vehicle moving next to the harvesting machine by means of a discharge chute and a discharge elbow 26 that can rotate about an approximately vertical axis and can be adjusted in inclination. Between the chopping device 22 and the conveying device 24 there is a post-processing device with two interacting rollers 28 through which the supplied crop is fed tangentially to the conveying device 24. Below, directional details, such as lateral, lower, and upper, refer to the forward direction V of the harvesting machine 10 running toward the left in FIG. 1.

The feeder housing 34 can be pivoted by means of an actuator 42 about the rotational axis of the chopping device 24 extending horizontally and perpendicular to the forward direction V in order to be able to adjust the height of the harvesting header 20 relative to the ground.

In FIG. 1, for reasons of better clarity, the harvesting header 20 is shown in a position disassembled from the harvesting machine 10. The fastening of the harvesting header 20 to the harvesting machine 10 is carried out by means of an intermediate frame 36 that is attached to the front side of the feeder housing 34 and is likewise shown in a detached position in FIG. 1. The intermediate frame 36 is supported on the feeder housing 34 by an upper pair of rollers 38 and a lower pair of rollers 40. The upper rollers 38 (FIGS. 2 and 3) are fastened on both sides at the front side of the feeder housing 34 on its top side and can rotate about horizontal axes extending in the forward direction V. The intermediate frame 36 comprises support elements 44 that are bent upward and are located in the assembled state in grooves of the rollers 38. The lower rollers 40 are supported in the lower region of the intermediate space 36 so that they can rotate. Their rotational axes are located in a vertical plane and run upward and inward at an angle. In the assembled state, the lower rollers 40 contact surfaces interacting with them in the lower area of the front side of the feeder housing 34. As a result, the intermediate frame 38 forms a swinging frame that is supported so that it can rotate relative to the feeder housing 34 about a virtual axis that extends horizontally and in the forward direction and is located approximately in the center of the feeder housing 34.

The intermediate frame 38 has, in its upper region on both sides, fastening devices 46 that are each realized in the form of pins. The harvesting header 20 is equipped in turn in its rear upper region with hooks 48 that surround the fastening devices 46 from above in the fastened state and lock the harvesting header 20 onto the intermediate frame 36.

The drive of the elements of the harvesting header 20 to be driven is carried out by a drive 50 on the side of the harvesting machine, wherein this drive could involve a hydraulic motor that is charged with pressurized hydraulic fluid by a hydraulic pump driven mechanically by a combustion engine of the harvesting machine 10. The rotational speed of the drive 50 can be adjusted, in order to be able to adapt the operating speed of the harvesting header 20 to its operating width, the forward speed of the harvesting machine 10 and/or the properties of the crop, for which refer to the disclosure of German Patent Document DE 10 2004 029 953 A1 (also with respect to the possibility of driving a discharge conveyor of the harvesting header 20 at a different speed than the pick-up conveyor, for which two drive trains would have to be provided between the harvesting machine 10 and the harvesting header 20). The drive 50 drives an output shaft 52 that extends forward in the forward direction up to the intermediate space 36. The output shaft 52 is constructed as a telescoping universal joint shaft. The output shaft 52 is coupled at its front end with a coupling half 54 that is on the side of the harvesting machine and forms a detachable coupling with a coupling half 56 on the side of the harvesting header. The coupling half 56 on the side of the harvesting header is connected to a harvesting header drive shaft 58 extending coaxial to the output shaft 52. The harvesting header drive shaft 58 is in drive connection by means of an angular gear 60 to a transverse shaft 62 that is used, in turn, for driving the elements of the harvesting header 20 to be driven, such as the reaping and pick-up devices (not shown) and the stalk lifting auger 64.

Figure 2:
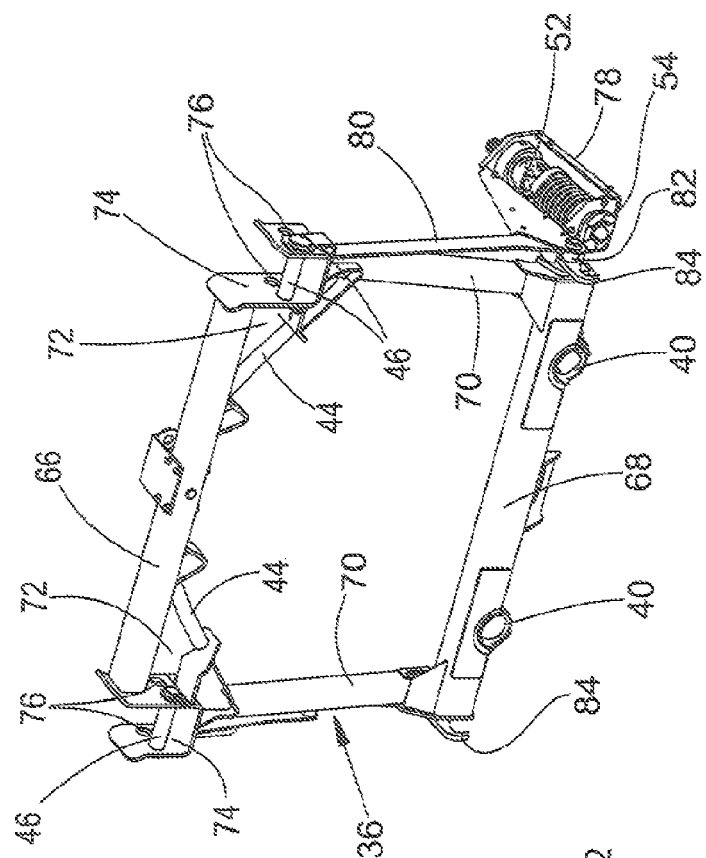
FIG. 2 is a perspective, schematic view of the intermediate frame from FIG. 1 with a fastening device located in the rear position.
Figure 3:
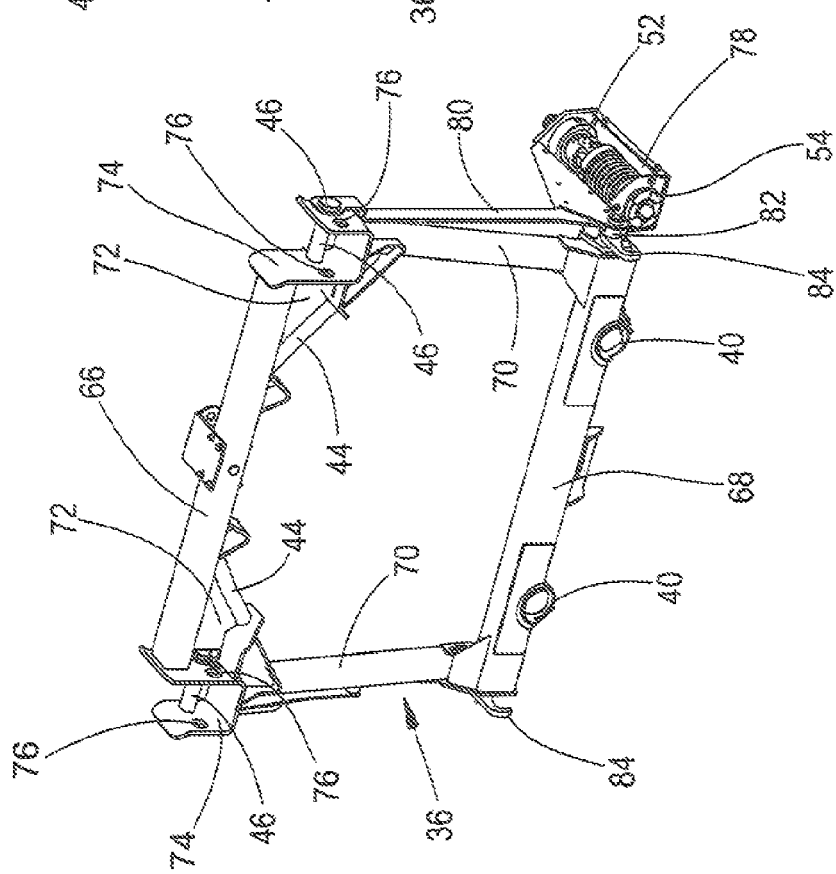
FIG. 3 is the view from FIG. 2 in a fastening device located in its front position.

The coupling halves 54, 56 could be constructed as mating claw couplings, as can be recognized with reference to the coupling half 54 on the side of the harvesting machine in FIGS. 2 and 3. As shown there, one coupling half or both coupling halves 54, 56 could be biased against the other coupling half 56, 54 by spring force. It is also conceivable to lock the coupling halves onto the side of the harvesting machine 10 or the harvesting header 20 by a separate actuator one against the other (see for example German Patent Document DE 10 2007 043 032 A1 whose disclosure is incorporated through reference in the present documents).

Reference is now made to FIG. 2, in which the intermediate space 36 is shown in a perspective diagram. The intermediate space 36 comprises an upper traverse 66 and a lower traverse 68 that are connected among each other by vertical supports 70 at two lateral ends. The lower rollers 40 are supported on the lower traverse 68 so that they can rotate. The support elements 44 each extend diagonally between a vertical support 70 and the lower traverse 66, wherein, for reinforcement, triangular plates 72 are also provided. The vertical support 70 and the traverse 66 are each connected to a U-shaped receptacle 74 on both sides of the traverse 66. The pockets of the receptacles 74 formed by the "U" extend horizontally and in the forward direction. Both lateral walls of the receptacles 74 are provided at two positions spaced apart in the forward direction with openings (especially boreholes) 76 extending horizontally and perpendicular to the forward direction. The fastening device 46 is placed in each one of the openings 76. It will be recognized with reference to a comparison of FIGS. 2 and 3 that inserting the fastening device 46 (for a detached harvesting header 20) selectively into one of two openings 76 allows a change to the inclination of the harvesting header 20, which allows it to be oriented approximately horizontally, independent of the corresponding working height.

The output shaft 52 is fastened in a holder 78 so that it can rotate. The holder 78 is supported on its side on the intermediate frame 36 on the Lateral end of the lower traverse 68 so that it can pivot about a rotational axis 82 extending horizontally and perpendicular to the forward direction and is connected to a bar 80 that extends up to the receptacle 74 arranged over the bar. The bar 80 is provided with a single opening through which the fastening device 46 extends. Consequently, if the fastening device 46 is repositioned between the openings 76, in order to change the inclination of the harvesting header 20 relative to the feeder housing 34, the bar 80 is also rotated about the rotational axis 82. This has the advantageous consequence that the orientation of the coupling half 54 on the side of the harvesting machine is adapted to the orientation of the harvesting header 20, such that it is automatically brought into engagement with the coupling half 56 on the side of the harvesting header when attaching the harvesting header 20. In this way, despite the rotation of the harvesting header 20 about the axis extending in the forward direction V and its adjustable inclination, it is always guaranteed that the coupling halves 54, 56 are automatically led into engagement when attaching the harvesting header 20 and automatically separate when removing the harvesting header 20.

Additional hooks 84 attached to the bottom side of the intermediate frame 36 allow a locking of the lower side of the harvesting header 20 on the intermediate frame 36. They could be detached manually or by actuators (not shown) for the removal of the harvesting header 20.

Having described the preferred embodiment, it will become apparent that various modifications can be made without departing from the scope of the invention as defined in the accompanying claims.

The invention claimed is:

1. A drive arrangement for a harvesting header of a harvesting machine, the harvesting machine having a chassis on which a feeder housing is fastened, a front side of the feeder housing having a fastening device on which a harvesting header is detachably fastened, the fastening device being movable with respect to the feeder housing, the drive arrangement comprising an output shaft for driving the header, the output shaft being set in rotation by the harvesting machine and coupled with the fastening device such that the output shaft moves with the fastening device relative to the feeder housing, and a harvesting header drive shaft of the harvesting header being drivingly connected to the output shaft:

wherein between the output shaft and the harvesting header drive shaft, a coupling is attached with two coupling halves that automatically separate when the harvesting header is disassembled from the feeder housing and automatically connect when the harvesting header is attached on the feeder housing.

2. A drive arrangement according to claim 1, wherein the fastening device is attached to an intermediate frame that moves relative to the feeder housing about an axis extending in the forward direction, and wherein one of: the fastening device is movable relative to the intermediate frame and the intermediate frame is movable relative to the feeder housing in the forward direction, and the coupling half on the side of the harvesting machine is coupled with the fastening device.

3. A drive arrangement according to claim 2, wherein the fastening device comprises two pins that are arranged on both sides and above a feeder opening of the feeder housing and extend horizontally and perpendicular to the forward direction and fixed with respect to the forward direction in different positions on the intermediate frame, wherein the harvesting header is equipped with hooks that can be brought from above into a position surrounding each pin.

4. A drive arrangement according to claim 3, wherein one of the pins is connected to the coupling half on the side of the harvesting machine by means of a bar hinged so that it can pivot about an axis that is horizontal and perpendicular to the forward direction such that the coupling half on the side of the harvesting machine is moved with the pin when it is brought into a different position.

5. A drive arrangement according to claim 4, wherein the pivot axis of the bar and the coupling half on the side of the harvesting machine are arranged laterally next to the lower end of the feeder housing.

6. A drive arrangement according to claim 3, wherein the pins are selectively inserted into one of a plurality of openings in U-shaped receptacles connected to the intermediate frame and an opening of the bar.

7. A drive arrangement according to claim 2, wherein the intermediate frame is supported by a roller support so that it rotates relative to the feeder housing about an axis extending in the forward direction.

8. A drive arrangement according to claim 1, wherein at least one of: the output shaft is a universal joint shaft that extends in the forward direction and is connected to a drive on the side of the harvesting machine; and the harvesting header drive shaft is drive-connected by means of an angular gear to a transverse shaft for the driving of drivable elements of the harvesting header.

9. A drive arrangement according to claim 1, wherein the output shaft and the harvesting header drive shaft extend in the forward direction.

10. A harvesting machine having a drive arrangement according to claim 1.

* * * * *